United States Patent
Shaffer et al.

(10) Patent No.: US 7,602,704 B2
(45) Date of Patent: Oct. 13, 2009

(54) SYSTEM AND METHOD FOR PROVIDING FAULT TOLERANT IP SERVICES

(75) Inventors: Shmuel Shaffer, Palo Alto, CA (US); Labhesh Patel, Mountain View, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1067 days.

(21) Appl. No.: 10/225,391

(22) Filed: Aug. 20, 2002

(65) Prior Publication Data

US 2004/0037219 A1    Feb. 26, 2004

(51) Int. Cl.
*G01R 31/08* (2006.01)
(52) U.S. Cl. .................. 370/218; 370/401; 370/352
(58) Field of Classification Search ......... 370/216–221, 370/244, 250, 400, 401, 352; 379/221.03, 379/221.04, 9, 112.02, 9.05, 279, 221.01, 379/273, 88.01, 88.16–88.18, 229; 340/3.43, 340/3.44
See application file for complete search history.

(56) References Cited

U.S. PATENT DOCUMENTS

| | | | | |
|---|---|---|---|---|
| 5,491,798 | A | 2/1996 | Bonsall et al. | 395/200.04 |
| 5,719,942 | A | 2/1998 | Aldred et al. | 380/49 |
| 6,018,805 | A | 1/2000 | Ma et al. | 714/4 |
| 6,269,336 | B1* | 7/2001 | Ladd et al. | 379/88.13 |
| 6,363,065 | B1 | 3/2002 | Thornton et al. | 370/352 |
| 6,522,743 | B1* | 2/2003 | Hurd | 379/266.04 |
| 6,584,185 | B1* | 6/2003 | Nixon | 379/201.01 |
| 6,665,537 | B1 | 12/2003 | Lioy | 455/435 |
| 6,785,223 | B1* | 8/2004 | Korpi et al. | 370/218 |
| 6,819,665 | B1* | 11/2004 | Pinard et al. | 370/352 |
| 6,973,027 | B1* | 12/2005 | Shaffer et al. | 370/218 |
| 2003/0035414 | A1* | 2/2003 | Beyda | 370/401 |
| 2003/0177411 | A1* | 9/2003 | Dinker et al. | 714/13 |

FOREIGN PATENT DOCUMENTS

| | | |
|---|---|---|
| EP | 1 056 254 A2 | 4/2000 |
| EP | 1 047 241 A2 | 10/2000 |
| WO | WO 00/33189 | 6/2000 |

(Continued)

OTHER PUBLICATIONS

Notification of Transmittal of PCT International Search Report mailed Dec. 16, 2003, authorized by Carole Emergy; for Application No.: PCT/US03/25095, citing the referenced patents/documents contained herein.

(Continued)

*Primary Examiner*—Ian N Moore
(74) *Attorney, Agent, or Firm*—Baker Botts L.L.P.

(57) ABSTRACT

A system and method for providing fault tolerant IP services includes establishing a first communication session between an originating telephony device and an application server, through a primary call manager. Failure of the primary call manager may be detected. A second communication session between the application server and a destination telephony device may be established via a back-up call manager. The first communication and the second communication session may be coupled at the application server to establish two-way communication between the originating telephony device and the destination telephony device.

18 Claims, 3 Drawing Sheets

FOREIGN PATENT DOCUMENTS

WO  WO 02/05488 A1  1/2002

OTHER PUBLICATIONS

Mon-Yen Luo and Chu-Sing Yang, "*Enabling fault resilience for web services*", Department of Computer Science and Engineering, National Sun Yat-Sen University, Taiwan, published by Computer Communications 25 (2002) pp. 198-209.

CA, Notification of Response due, Appln. No. 2,494,453, 3 pages.

* cited by examiner

| 102 | 104 | 106 | 108 | 110 | 112 | 114 | 116 | 118 |
|---|---|---|---|---|---|---|---|---|
| INDEX | GLOBAL CALL ID | FROM | TO | START TIME | END TIME | ASSOCIATED CALL | ASSOCIATED CALL MANAGER | TRANSFER ENDPOINT |
| 1 | ABC | 12643... | 42216... (AGENT) | 1/1/2002 13:27:23 | 1/1/2002 13:32:37 | 0 | $CM_1$ | $A_2$ |
| 2 | XYZ | 43265... | 51137... (AGENT) | 1/1/2002 14:03:42 | 1/1/2002 14:13:29 | 0 | $CM_1$ | $A_1$ |
| 3 | CBA | 52143... | APPLICATION SERVER | 1/1/2002 14:26:03 | 1/1/2002 14:33:05 | 4 | $CM_1$ | |
| 4 | BAC | APPLICATION | 42371 | 1/1/2002 14:28:07 | 1/1/2002 14:33:05 | 3 | $CM_2$ | $A_3$ |
| ⋮ | ⋮ | ⋮ | ⋮ | ⋮ | ⋮ | ⋮ | ⋮ | ⋮ |
| N | N | N | N | N | N | N | N | N |

SYSTEM AND METHOD FOR PROVIDING FAULT TOLERANT IP SERVICES

TECHNICAL FIELD OF THE INVENTION

This invention relates generally to the field of packet-based communication networks, and more specifically to a system and method for providing fault tolerant IP services.

BACKGROUND OF THE INVENTION

Historically, telecommunications have involved the transmission of voice and fax signals over a network dedicated to telecommunications, such as the Public Switched Telephone Network (PSTN) or a Private Branch Exchange (PBX). Similarly, data communications between computers have also historically been transmitted on a dedicated data network, such as a local area network (LAN) or a wide area network (WAN). Currently, telecommunications and data transmissions are being merged into an integrated communication network using technologies such as Voice over Internet Protocol (VoIP). Since many LANs and WANs transmit computer data using Internet Protocol (IP), VoIP uses this existing technology to transmit voice and fax signals by converting these signals into digital data and encapsulating the data for transmission over an IP network. However, the integration of telecommunications and data transmissions is still ongoing, and many features that were available to users of traditional telecommunications networks have not been made available to users of VoIP and similar technologies.

The reliability of PBXs and central offices (COs) has improved over the years and is said to meet the high mark of five nines. To address the same requirements for the VoIP Market, substantial effort has gone into handling failures in call managers (CMs) and the attached servers. Both PBXs and call managers rely on a backup processor that takes over call processing tasks in the case where the primary call manager fails. With the fail over mechanism of the call manager, users whose phones are connected to a call manager that fails can continue their call but can not invoke any supplementary services. After the calls are terminated, the phones that were homed to the failed call manager re-home to the backup call manager and provide full feature service to the users.

SUMMARY OF THE INVENTION

The present invention includes a system and method for providing fault tolerant IP services that substantially eliminates or reduces disadvantages or problems associated with previously developed systems and methods. In particular, the present invention contemplates an application server that is operable to establish a communication session with a telephony device using a primary call manager, detect failure of the call manager, initiate a second communication session with a destination telephony device using a back-up call manager, and couple the first communication session with the second communication session to allow communication between the telephony device and the destination telephony device, through the application server.

In accordance with a particular embodiment of the present invention, a method for providing fault tolerant IP services includes establishing a first communication session between an originating telephony device and an application server, through a primary call manager. A failure of the primary call manager may be detected. A second communication session between the application server and a destination telephony device is established via a back-up call manager. The first communication session and the second communication session are coupled at the application server to establish two-way communication between the originating telephony device and the destination telephony device.

In accordance with another embodiment of the present invention, a method of fault tolerant communication between telephony devices comprises establishing a communication session between a first telephony device and a second telephony device using a gateway. The communication session includes media and signaling information. The communication session is managed using out-of-band signaling among the gateway, call manager and the second telephony device, if the call manager is active. The communication session is managed using in-band signaling between the gateway and the second telephony device if a failure of the call manager is detected.

Technical advantages of particular embodiments of the present invention include an application server that is operable to detect failure of a call manager, and maintain a communication session with a telephony device. The application server initiates a communication session with a destination telephony device using a back-up call manager, and tunnels the first and second communication sessions through the application server. Accordingly, users experience little or no interruption or inconvenience due to failure of a call manager during a communication session with the application server.

Another technical advantage of particular embodiments of the present invention includes a gateway that is operable to detect failure of a call manager that is managing signaling between the gateway and an IP telephony device. While the call manager is active, the gateway separates media and signaling of the communication session, and communicates signaling to the call manager. If the call manager fails, the gateway communicates both media and signaling to the IP telephony device, in-band.

Still another technical advantage of particular embodiments of the present invention includes a communication system that is tolerant to the failure of a call manager. Accordingly, auxiliary services are provided to end users of the communication system who initiated a communication session using a primary call manager, which failed after the communication session had been established.

Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

Figure 1:
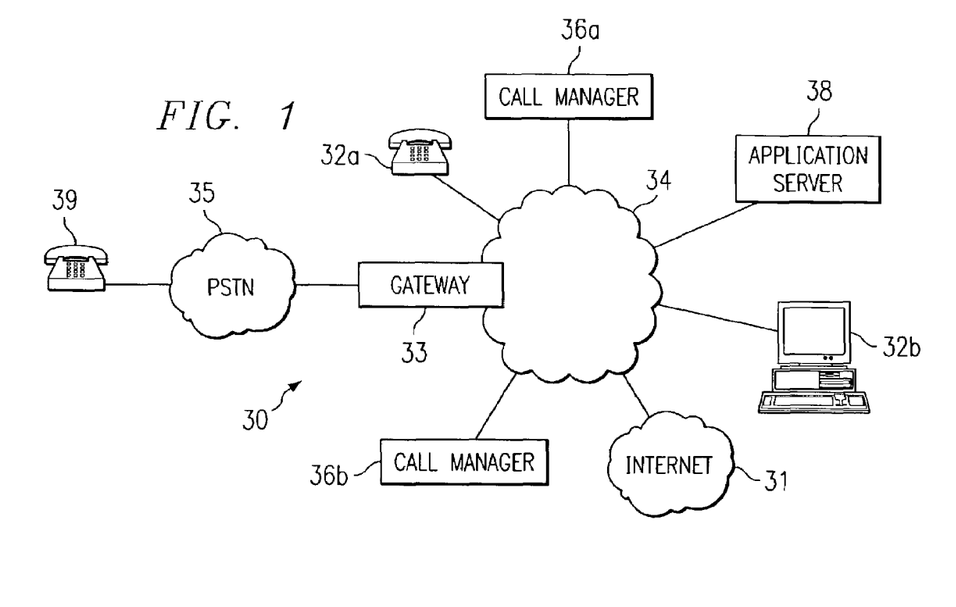
FIG. 1 illustrates a communications network in accordance with a particular embodiment of the present invention.

FIG. 1 illustrates a communication system 30 that includes endpoints 32a and 32b (generally referred to as endpoints 32), that may be used to establish a communication session with an application server 38, using network 34. Application server 38 may include an automated attendant (AA), automatic call distributor (ACD), interactive voice response (IVR) system, a queue manager, or any other server providing services to a user of communication system 30. Call managers 36a and 36b (generally referred to as call managers 36) control one or more of endpoints 32, application server 38, gateway 33 and/or communication sessions between two or more of such components. Components of network 34 are configured to allow for the failure of a call manager of a communication session with application server 38, without disconnecting the user.

In accordance with a particular embodiment, application server 38 may be configured to detect the failure of a call manager 36, and establish a communication session with a backup call manager. The backup call manager is used to complete the communication session with little or no interruption or inconvenience of the user. For example, application server 38 may be used to connect endpoint 32 with an agent of application server 38, by tunneling the communication session through application server 38, and using the backup call manager. Therefore, the communication session between an endpoint 32 and application server 38 may continue uninterrupted by the failure of TCP/IP communication with call manager 36, and/or a disruption of service experienced at call manager 36. Thus, components of communication system 30 are tolerant to the fault of a call manager. Accordingly, auxiliary services are provided to end users of communication system 30 who initiated a communication session using a primary call manager, which failed after the communication session had been established. Various examples and embodiments are described herein, with regard to FIGS. 2-6.

Application server 38 may be any server configured to provide internet protocol (IP) services to a user of network 34. For example, in a particular embodiment, application server 38 may include an automated attendant. An automated attendant is a device which answers callers with a digital recording, and allows callers to route their call to an extension through touch tone input (e.g., dual tone multi-frequency, or DTMF), in response to a voice prompt. An automated attendant avoids the intervention of a human being who uses an attendant console, thereby avoiding related personnel cost.

Application server 38 may also include an automatic call distributor (ACD). An ACD is a specialized phone system used to route incoming calls to available personnel so that calls are evenly, or intelligently distributed. ACDs may also be used by companies in making outgoing calls. ACDs typically perform at least 4 functions: (i) recognize and answer an incoming call; (ii) look in a database for instructions on what to do with the call; (iii) based on these instructions place the caller on hold (e.g., in a queue manager) and/or play a recording; and (iv) transfer the call to an agent as soon as the agent is available to receive the call and the caller is next in the queue, for the available agent.

Application server 38 may also include an interactive voice response (IVR) System. An IVR system may be used to receive calls and route the call and/or exchange media with the caller based on indications (e.g., DTMF) received from the caller. This allows the caller to receive information from the IVR system in response to touch tone selections made by the caller. The information may include weather, stock quotes, sports' scores, or other news or topics.

Application server 38 may also include a queue manager. A queue manager is used to maintain callers in a predetermined order, such that the callers may be sequentially and/or intelligently distributed to various agents for services available from the server, when the agent and/or server are available. It should be recognized within the teachings of the present invention that application server 38 may include one or any combination of the components described above. Furthermore, application server 38 may comprise any component or components that provide services to an end user, without regard to the specific services being provided, within the spirit and scope of the present invention.

In accordance with a particular embodiment of the present invention, application server 38 communicates with network 34 using Java Telephony API (JTAPI). JTAPI is a set of modularly-designed, application programming interfaces for Java based computer telephony applications or services. JTAPI signaling is used to: (i) setup/tear down communication sessions between components of network 34, (ii) transfer communication sessions between components of network 34, and/or (iii) pass DTMF (out-of-band). JTAPI also provides other services and functionality including auxiliary services (e.g., conferencing). The list of services and functionality described above, which are available using JTAPI signaling, is provided for example only, and is not an exhaustive list. It should be recognized, however, that other signaling protocols may be used, in accordance with the teachings of the present invention.

Endpoints 32 may be any combination of hardware and/or software that provide communication services to a user. For example, endpoints 32 may be a telephone, a computer running telephony software, a video monitor, a camera, or any other communication or processing hardware, software and/ or embedded logic that supports the communication of packets of media using network 34. Endpoints 32 may also include unattended or automated systems, gateways, multipoint control unit (MCU) other intermediate components, or other devices that can establish or terminate media sessions. Although FIG. 1 illustrates two endpoints 32, communication system 30 contemplates any number and arrangement of endpoints 32 for communicating media. Furthermore, the described technologies and techniques for establishing a communication session between endpoints 32 may be adapted to establish a conference between more than two endpoints 32.

Although a specific communication network 34 is illustrated in FIG. 1, the term "communication network" should be interpreted as generically defining any network capable of transmitting audio and/or video telecommunication signals, data, and/or messages. Network 34 may be a local area network (LAN), wide area network (WAN), global distributed network such as the Internet, Intranet, Extranet, or any other form of wireless or wireline communication network. Generally, network 34 provides for the communication of packets, cells, frames, or other portions of information (generally referred to as packets) between components of network 34. Network 34 may include any combination of gateways, routers, hubs, switches, and other hardware and/or software implementing any number of communication protocols that allow for the exchange of packets in communication system 30.

In a particular embodiment, network 34 employs communication protocols that allow for the addressing or identification of endpoints 32 coupled to network 34. For example, using Internet protocol (IP), each of the components coupled together by network 34 in communication system 30 may be identified in information directed using IP addresses (e.g., a 32 bit unique identifier). In this manner, network 34 may support any form and/or combination of point-to-point, multicast, unicast, or other techniques for exchanging media packets among components in communication system 30. Although the subsequent description will primarily focus on IP telephony devices, it should be understood that other appropriate telephony devices, such as Voice over Frame Relay devices, are also included within the scope of this description.

Network 34 may be directly coupled to other IP networks including, but not limited to, the Internet 31. Since IP networks share a common method of transmitting data, telecommunication signals may be transmitted between telephony devices located on different, but interconnected, IP networks. In addition to being coupled to other IP networks, network 34 may also be coupled to non-IP telecommunication networks through the use of gateway 33. For example, network 34 is coupled to Public Switched Telephone Network (PSTN) 35. PSTN 35 includes switching stations, central offices, mobile telephone switching offices, pager switching offices, remote terminals, and other related telecommunications equipment that are located across the country.

IP networks transmit data (including voice and video data) by placing the data in packets and sending each packet individually to the selected destination. Unlike a circuit-switched network (like PSTN 35), dedicated bandwidth is not required for the duration of a call or fax transmission over IP networks. Instead, each telephony device sends packets across the network as they become available for transmission. This feature makes bandwidth available for other data when voice or fax data is not being transmitted.

The technology that allows telecommunications to be transmitted over an IP network may be referred to as Voice over IP (VoIP). In the illustrated embodiment, endpoints 32 are IP telephony devices. IP telephony devices have the capability of encapsulating a user's voice (or other inputs) into IP packets so that the voice can be transmitted over network 34. IP telephony devices may include telephones, fax machines, computers running telephony software (such as MICROSOFT NETMEETING), gateways, or any other device capable of performing telephony functions over an IP network.

Call managers 36 include hardware, software, and/or embedded logic operable to identify, control, count, and/or supervise the traffic or flow through it. Call managers 36 also include terminal and gateway registration regarding components of network 34, address resolution, bandwidth control, admission control, etc. In general, call managers 36 perform network administrator functionality with regard to endpoints 32 and/or other components of network 34 under its control. Although FIG. 1 illustrates two call managers 36, network 34 contemplates any number and configuration of call managers 36.

Call manager 36 may be centrally located within network 34, or distributed between a plurality of components of network 34. Each call manager 36 is an application that controls call processing, routing, telephone features and options (such as call hold, call transfer, and caller ID), device configuration, and other telephony functions and parameters within communication network 34.

Each call manager 36 can control one or more endpoints 32 coupled with network 34. Call manager 36 may be implemented as software executing on one or more computers coupled to network 34. The call manager software may be embodied in any type of computer-readable medium including, without limitation, hard drives, flash memory, diskettes, CD-ROMs, DVD-ROMs, or other optical or magnetic storage devices.

When an endpoint 32 is connected to network 34 or elsewhere in communication system 30 (or when it otherwise comes on-line), endpoint 32 may be assigned an IP address. The endpoint then registers with one or more call managers 36 with which it can communicate using its telephone number and/or its IP address. Alternatively, endpoint 32 may request that it be assigned a telephone number and/or an IP address by call manager 36. The term "telephone number" should be understood to include any appropriate combination of digits or characters or any other appropriate method of identifying a telephony device. Call manager 36 with which an endpoint 32 has registered creates an internal device process that is used to route signaling to and from endpoints 32 and application server 38, from call manager 36, or other endpoints coupled with network 34.

The ability of a call manager 36 to control any communication session between users of endpoints 32 and/or application server 38 in communication system 30 allows a call processing environment in which control of communication sessions between or among users of endpoints 32 and/or application server 38 may be distributed dynamically in response to changes in communication system 30. For example, if a call manager 36a goes offline, the endpoint 32 that was originally homed to that call manager 36a can home and register to an alternative call manager 36b. Likewise, if a communication link between an endpoint 32 and a call manager 36a goes down, the endpoint 32 may home and register to an alternative call manager 36b to which there is an operable communication path. Furthermore, the flexible homing capability of endpoints 32 also provides for network scalability and loadsharing by allowing endpoints 32 to be homed to any call manager 36, regardless of physical location. This avoids excess load on a particular call manager 36 when new endpoints 32 come on line, and provides load balancing between call managers 36.

When a user wishes to place a call from an endpoint 32 to another IP telephony device on network 34 (an intra-LAN call, for example), the calling telephony device transmits a signal to call manager 36a with which it is registered, indicating the desired function and the telephony device to be called. Call manager 36a then checks on the availability of the called telephony device and, if available, sets up the call by instructing the originating telephony device to establish a media (audio and/or video) stream with the called (target) telephony device. The initial signaling between call manager 36a and either the originating telephony device or the target telephony device is transmitted over network 34 using, for example, the Transmission Control Protocol (TCP).

The call is initiated by an endpoint 32 using call manager 36a, or with the cooperation of call manager 36a, using signaling over TCP. A codec (coder/decoder) at the endpoint converts the voice, video or fax signals generated by the users of the telephony devices from analog media signals into digital form. The codec may be implemented either in software or as special-purpose hardware in endpoints 32. In the case of an IP telephone, as the user speaks into the handset, the codec converts the analog voice signals into digital data. The digitally encoded data is then encapsulated into IP packets so that it can be transmitted over network 34.

The encapsulation may be performed by Real-Time Transport Protocol (RTP) running over User Datagram Protocol (UDP), or any other suitable communication protocol. As with TCP, UDP uses the Internet Protocol to get data packets from one computer to another. Unlike TCP, however, UDP does not provide sequencing and error-checking of the arriving packets. Once a UDP media packet has been received at the destination telephony device, a codec in the destination telephony device translates the digital data into analog audio and/or video signals for presentation to the user. The entire process is repeated each time that any call participant (or any other source) generates an audio, video, or fax signal.

In addition to intra-LAN calls, calls can also be placed to and received from non-IP telephony devices that are connected to PSTN 35. Such calls are made through gateway 33. Gateway 33 accomplishes at least these things: (i) converts signaling protocols (e.g., digital or analog to packets); (ii) transcoding; and (iii) converts between address of PSTN and the TCP address. For example, gateway 33 may convert analog or digital circuit-switched data transmitted by PSTN 35 to packetized data transmitted by network 34, and vice-versa. When voice data packets are transmitted from network 34, gateway 33 retrieves the data contained in the incoming packets and converts this digital data to the analog or digital format used by the PSTN trunk to which gateway 33 is coupled. Since the digital format for voice transmissions over an IP network is often different than the format used on the digital trunks of PSTN 35, the gateway provides conversion between these different digital formats, which is referred to as transcoding. Gateway 33 also translates between the VoIP call control system and other signaling protocols (e.g., JTAPI, SS7, T1, ISDN, etc.), used in PSTN 35 and converts between the address of the PSTN and the TCP address.

For voice transmissions from PSTN 35 to network 34, the process is reversed. In a particular embodiment, gateway 33 takes the incoming voice transmission (in either analog or digital form) and converts it into the digital format used by network 34. The digital data is then encapsulated into IP packets and transmitted over network 34.

When making a call to a PSTN telephony device 39 from IP telephony device 32, the voice or fax signal generated by the user of IP telephony device 32 is digitized and encapsulated, as described above. The packets are then transmitted over network 34 to gateway 33. If more than one PSTN gateway 33 is coupled to network 34, call manager 36 determines which gateway is to receive the transmission based on the telephone number (e.g., the North American Numbering Plan (NANP) number) of the PSTN telephony device. Gateway 33 receives the IP packets and converts the data to the format (either digital or analog) used by the PSTN trunk to which the gateway is connected. The voice signals are then sent to PSTN telephony device 39 over PSTN 35. This process, and the reverse process, is continued between PSTN 35 and network 34 through gateway 33 until the call is complete.

When a call is placed to an IP telephony device, for example application server 38, a call initiation request is first sent to call manager 36. If the originating telephony device is an IP telephony device (e.g., an intra-LAN or inter-LAN IP call), the originating IP telephony device generates the call initiation request and sends the request to call manager 36. If the originating telephony device is a non-IP telephony device, such as PSTN telephony device 39, gateway 33 first receives the incoming call, and sends a call initiation request to call manager 36 indicating the IP telephony device that is being called. In either case, once call manager 36 receives the call initiation request, call manager 36 sends a signal to application server 38 offering the call to the telephony device.

If application server 38 can accept the call application server 38 replies to call manager 36 that it will accept the call. Once application server 38 has accepted the call, the two endpoints (application server 38 and IP telephony device 32) establish RTP audio and/or video streams between application server 38 and the originating telephony device. If the originating telephony device is a non-IP telephony device, such as PSTN telephony device 39, the media streaming occurs between IP telephony device 32 and gateway 33. Gateway 33 then transmits the audio and/or video data to PSTN telephony device 39.

Figure 2:
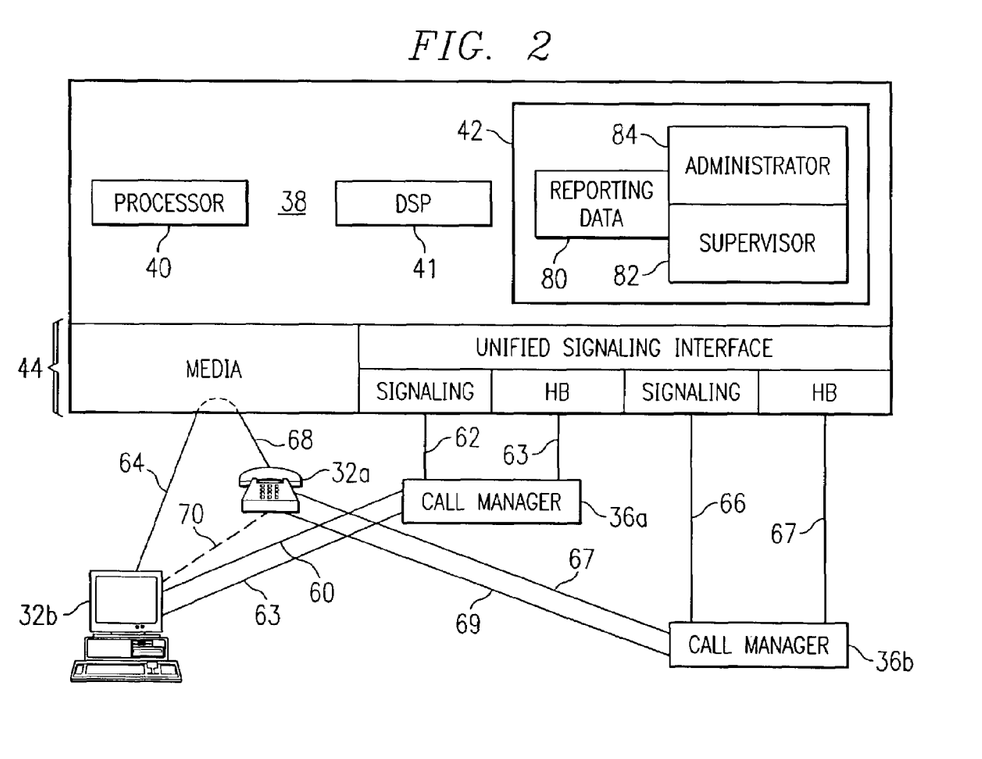
FIG. 2 illustrates a communication session between an originating telephony device, an application server, and a destination telephony device, in accordance with a particular embodiment of the present invention.

FIG. 2 illustrates a communication session between endpoint 32b and application server 38 using network 34. Application server 38 includes a processor 40, a memory 42, a network interface 44, and a digital signal processor (DSP) 41. DSP 41 accomplishes transcoding, echo canceling, and/or other media processing functionality. Although JTAPI, TCP and UDP protocols are specifically identified in the following discussion, any other suitable signaling and media transmission protocols may be employed within the teachings of the present invention.

In general, a communication session with an endpoint includes one or more signaling communication links, and one or more media communication links. For call manager-routed signaling, call signaling is routed from an endpoint to a call manager using a signaling communication link, instead of communication signals from endpoint to endpoint. Audio, video or other media, on the other hand, is communicated from endpoint to endpoint. Signaling communication links communicate call processing and control signals between endpoints 32 and call manager 36a. Call Control signals include call initiation requests, information about the capabilities of each telephony device, instructions about establishing and/or tearing down logical channels (e.g., media communication links), and information about flow control. Out-of-band DTMF signals are also transmitted as call control signals.

Media communication links are used to transfer audio and/or video media between endpoints. For example, during a telephone conversation, voice packets comprising the conversation between users of endpoints 32a, 32b and/or application server 38 are transmitted over media communication links. Similarly, media communication links may be used to transfer stored audio or video files and other information between application server 38 and endpoint 32b. Application server 38 may also be configured to send and receive any type of media, including voice to and from a user of endpoint 32.

As illustrated in FIG. 2, a communication session is established between telephony device 32b and application server 38. Accordingly, signaling communication links 60 and 62 are established between telephony device 32b and call manager 36a, and application server 38 and call manager 36a, respectively. After setting up the call, a media communication link 64 is established between telephony device 32b and application server 38.

During the course of the communication session between application server 38 and endpoint 32b, call control signaling, as well as DTMF signals are communicated from endpoint 32b to application server 38 via call manager 36a, using communication links 60 and 62. Communication media (audio or video messages) which comprise the communication session between endpoint 32b and application server 38 is communicated using media streaming communication link 64. Call manager 36a offers control, management features and services to endpoint 32b and application server 38, which may be used during the communication session. The control of such features is accomplished using call control signaling over communication links 60 and 62.

In order to continuously monitor (check for failure) of the signaling communication link 62 between application server 38 and call manager 36a, and between endpoints 32 and call manager 36a, heartbeat signals are exchanged over a TCP/IP signaling layer 63. Heartbeat signals are periodic communications between endpoints 32 and call manager 36a, and application server 38 and call manager 36a, to ensure that communication link 62 is still active, and that application server 38 and call manager 36a are still capable of communicating with each other. Heartbeat signals may also be referred to as "keep alive" signals. Any interruptions in keep alive signals between application server 38 and call manager 36a will be detected by application server 38. Such failure will not impact the ability of application server 38 and telephony device 32b to exchange media over pre-established media communication link 64. However, after the signaling communication link between call manager 36a and application server 38 is interrupted or fails, application server 38 looses the ability to receive DTMF signals, transfer calls to other users and/or ACD agents, etc. The teachings of the present invention provide a system and method wherein communication sessions may be preserved after failure of the call manager, or signaling communication link 62.

As a first example, assume application server 38 is an automated attendant. Just as a communication session between telephony device 32b and application server 38 is established, call manager 36a fails. Automated attendant 38 detects that JTAPI connectivity (signaling) to call manager 36a has failed since keep alive signals are no longer being received by automated attendant 38. In this event, automated attendant 38 is configured to replace any DTMF functionality with in-band adaptive speech recognition (ASR) functionality. Accordingly, automated attendant 38 asks the caller at telephony device 32b to speak the telephone number, identification number, or name of the called party rather than keying it in with touchtones. When the destination address is obtained, automated attendant 38 establishes a communication link with a backup call manager, for example call manager 36b. Therefore, signaling communication link 66 is established between automated attendant 38 and call manager 36b. Automated attendant 38 also receives heartbeat signals from call manager 36b over communication link 67.

Next, automated attendant 38 originates a communication session with the destination address, for example, telephony device 32a using the JTAPI connectivity of signaling communication link 66 with backup call manager 36b and signaling communication link 69 between call manager 36b and telephony device 32a. In this manner, a media communication link 68 is established between automated attendant 38 and endpoint 32a. As the communication session is established between automated attendant 38, and endpoint 32a, automated attendant 38 tunnels the media from telephony device 32b to telephony device 32a. This effectively achieves a transfer function by creating a new call and tunneling media through automated attendant 38. Accordingly, automated attendant 38 acts as an intermediary for a communication session over media communication links 64 and 68 to accommodate a communication session between telephony device 32b and telephony device 32a. If call manager 36a had not failed, a media communication link 70 (shown in dotted lines) would have been established directly between telephony device 32a and 32b.

Figure 3:
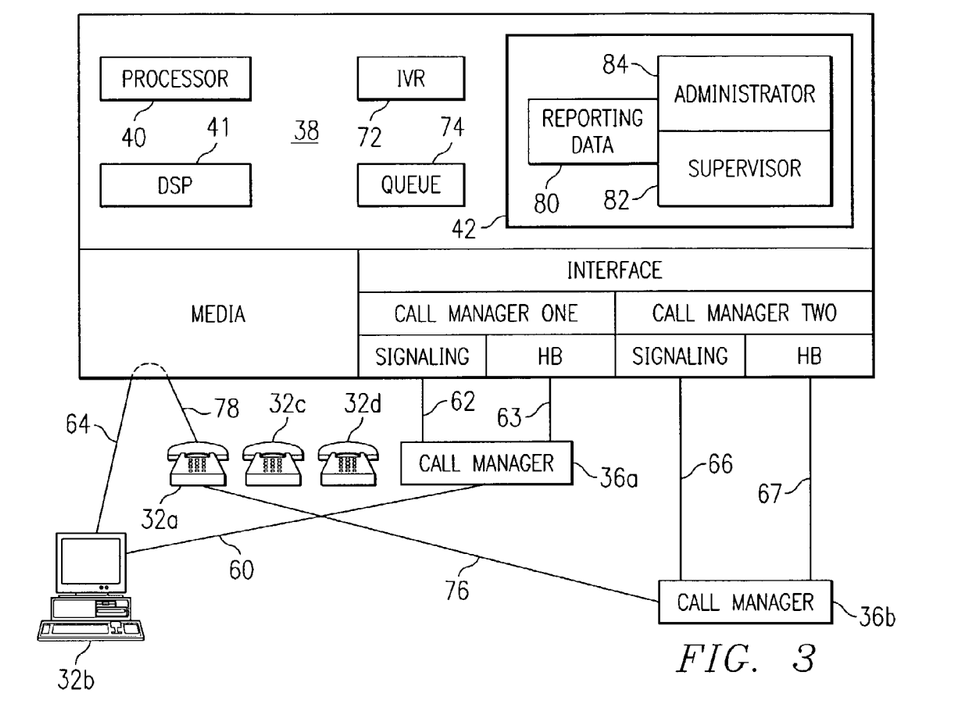
FIG. 3 illustrates a communication session between an originating telephony device, an automatic call distributor, and an agent associated with the automatic call distributor, in accordance with another embodiment to the present invention.

FIG. 3 illustrates another embodiment of the present invention. In the embodiment of FIG. 3 application server 38 comprises an automatic call distributor (ACD). A communication session is established between telephony device 32b and automatic call distributor 38 using call manager 36a. The communication session includes signaling communication links 60 and 62, and media communication link 64, as described with regard to FIG. 2. Automatic call distributor 38 also monitors heartbeat signals of call manager 36a over a portion of signaling communication link 62 labeled 63. The caller is greeted by IVR system 72 which provides information requested by the caller, before she is transferred to an appropriate queue 74. While the caller is waiting for one of the agents at endpoints 32a, 32c, or 32d to become available, call manager 36a fails.

At this point, any endpoints that are inactive, for example endpoints 32a, 32c and 32d, detect the failure of call manager 36a, and automatically rehome to backup call manager 36b. This allows backup call manager 36b to control any communication session(s) that are ultimately established with any one or more of endpoints 32a, 32c or 32d.

Rather than disconnecting the caller who is now waiting in queue 74, automatic call distributor 38 establishes JTAPI connectivity with a backup call manager by establishing signaling communication link 66 with call manager 36b. Automatic call distributor 38 then monitors the status of agents 32a, 32c and 32d via the newly established JTAPI connectivity with backup call manager 36b. When automatic call distributor 38 detects that an agent is freed up, for example the agent at endpoint 32a, automatic call distributor 38 originates a communication session with endpoint 32a using backup call manager 36b. The communications session between automatic call distributor 38 and backup call manager 36b includes signaling communication link 66 and a media communication link 67.

As the communication session between automatic call distributor 38 and endpoint 32a is established, automatic call distributor 38 tunnels media from the caller at endpoint 32b to the agent at endpoint 32a. This is accomplished by receiving media over media communication link 64 and transmitting the media to endpoint 32a over media communication link 78. This effectively achieves a transfer function by creating a new call and tunneling the media through automatic call distributor 38.

Fault tolerance for an IVR, queue manager, and/or any other type of application server can be achieved in a similar way to the above mentioned scenarios. In accordance with the present invention, the application server generally has two phases: (i) steady state; or (ii) transition phase. In the steady state phase, the application server is connected to the primary call manager and it processes calls using normal operation that includes, for example, transfer of the call (e.g., by an automated attendant or interactive voice response system). The application server enters the transition phase if the application server is handling active calls that originated via the primary call manager, and the primary call manager fails. During the transition phase, the application server establishes signaling connectivity to a backup call manager (in particular embodiments, this connectivity could have been pre-established before the primary call manager failed). Using the backup call manager, the application server tunnels media through the server and connects the media to the new destination by originating a call to the desired destination. The tunneling of media ("tromboning" of the voice) along with the "make call" operation via the backup call manager emulates and replaces the "transfer call" operation which can not be achieved via the primary call manager which went down.

All new calls to the application server would be handled via the backup call manager, and processed in a similar way as normal calls during the steady state phase. During the transition phase, the application server handles calls that originated via the failed call manager by using the voice tunneling and "make call" functionality, while calls that originated via the backup call manager are handled by using the normal treatment and call transfer. The transition phase ends when all calls that originated via the failed call manager are complete and terminated. At this time, the application server enters a new steady state phase, wherein it processes all calls in collaboration with the backup call manager, which is now functioning as primary call manager.

In accordance with a particular embodiment of the present invention, database 42 may be used to store various information and reporting data regarding communication sessions in which application server 38 is involved. Reporting data 80 may include supervisor reporting data 82 and administrator reporting data 84. For reasons to be described below, supervisor reporting data 82 may differ from administrator reporting data 84, in accordance with the present invention. Such reporting data 80 may include real-time reporting data and historical reporting data.

Figure 4:
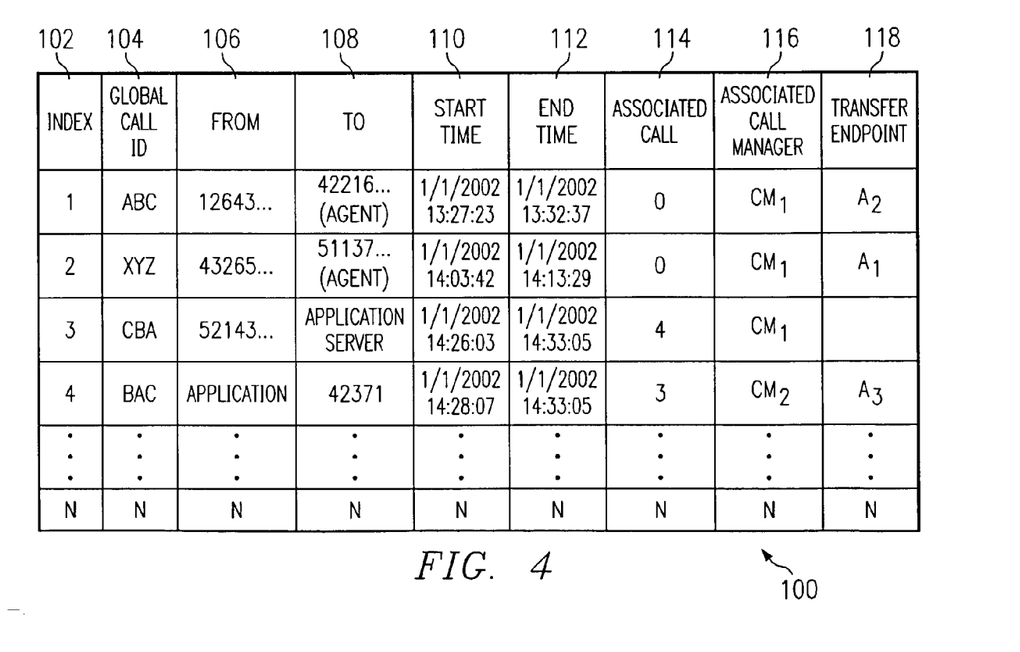
FIG. 4 illustrates a table of information that may be stored at a database of the application server.

FIG. 4 illustrates a table 100 of reporting data 80 which may be stored in database 42, in accordance with a particular embodiment of the present invention. Index column 102 records an index number for each call, and may be chronologically sequential with regard to calls received by and/or made by application server 38. Column 104 delineates a global call identification number which is a unique identification number for the call. Columns 106 and 108 identify the call origination, and destination, respectively. The start time and end time of each call, or communication session, is recorded at columns 110 and 112, respectively.

Column 114 is used to identify the index number of any "associated call(s)". In a particular embodiment of the present invention an "associated call" refers to any calls made by application server 38 in response to failure of one or more call managers. Column 116 designates the associated call manager, which identifies the call manager responsible for a portion of the communication session (e.g., signaling). Column 118 identifies the endpoint to which a call was transferred. For example, if application server 38 were serving as an automatic call distributor, the transfer endpoint would refer to one of several agents available to field calls from users of application server 38.

Supervisor reporting data 82 is primarily focused upon management of the various agents. In the case of a failed call manager, an agent's supervisor would not be concerned about how a particular call was accomplished. Instead, the agent's supervisor is interested in "core" information including which agent received the call, where the call originated from, and how long the agent participated in the communication session. Therefore, any transfer of call managers, or tunneling of a communication session through application server 38 could be transparent to the agent's supervisor.

Administrator reporting data 84 is primarily focused upon performance of the network and associated components, including applications server 38. Therefore, an administrator receiving administrator reporting data would receive particular information regarding failure of a call manager, and/or tunneling of a communication session through application server 38.

FIG. 4 illustrates an example of how supervisor reporting data 82 and administrator reporting data 84 may be handled differently, and reported differently, to a supervisor, or administrator, respectively. Index numbers 1 and 2 illustrate calls having global call IDs of abc and xyz, respectively. The IP address of the originating endpoint, or user, is illustrated in column 106. The IP address associated with the agent that ultimately received the call is indicated in column 108. Start and end times are indicated in columns 110 and 112. Since no failure occurred, there are no associated calls reported in column 114. $CM_1$ handled the calls, and the calls were transferred to agents $A_2$ and $A_1$, respectively. Index number 3 having a global call ID of CBA was received from an endpoint having an IP address 52143 . . . (a 32 bit identifier) and was received at application server 38. However, call manager $CM_1$ failed while the user was assigned to queue 74. Therefore, application server 38 initiated a communication session with agent $A_3$, when agent $A_3$ was available. The communication session between application server 38 and agent $A_3$ is illustrated as index number 4.

Administrator reporting data 84 would include each of index numbers 3 and 4, as well as an indication of the failure of $CM_1$ during the communication session. This allows the administrator to perform debugging and diagnostic information. However, for the purposes of supervisor reporting data 82, Index numbers 3 and 4 would be combined, since the net effect was a single communication session between the user and agent $A_3$.

Figure 5:
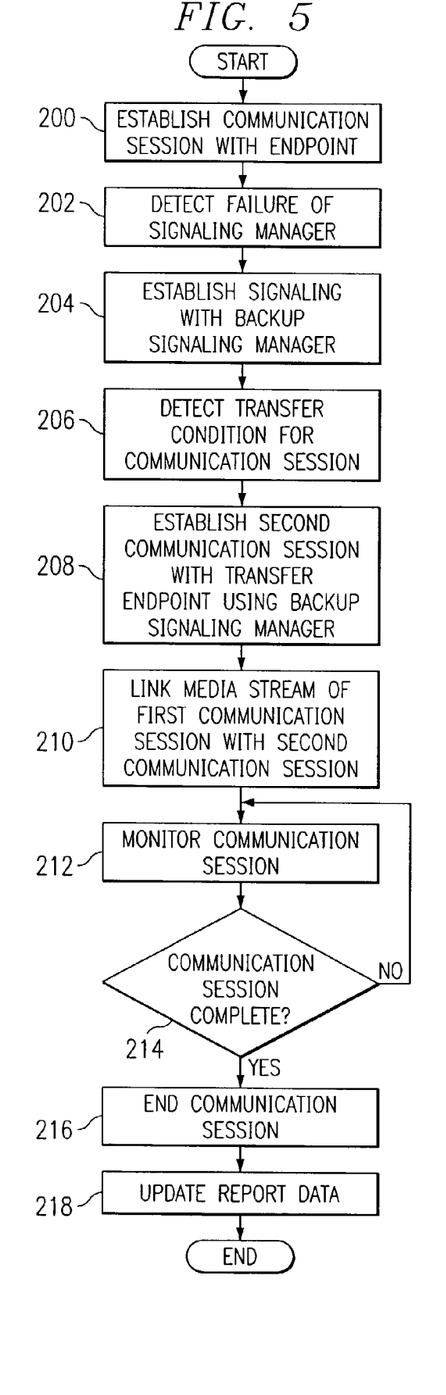
FIG. 5 illustrates a method for providing fault tolerate IP services, in accordance with a particular embodiment of the present invention.

FIG. 5 illustrates a method for providing fault tolerant IP services, in accordance with a particular embodiment of the present invention. The method begins at step 200 where a communication session is established between at least two endpoints. Endpoints may include telephony devices, application servers, gateways, and/or any telecommunication devices. At step 202, failure of a signaling manager is detected. For example, a gateway may be acting as an intermediary of the communication session managing signaling between the two or more endpoints. At step 204, signaling is established with a backup signaling manager.

In the embodiments of FIGS. 2 and 3, an application server may be the endpoint which detects failure of a call manager which is managing signaling between the endpoints (e.g. telephony device and application server). In this case, the application server may initiate the connection with a backup call manager, or signaling manager. It should be recognized within the teachings of the present invention that the connection with the backup signaling manager may take place before a failure of the primary signaling manager is detected. For example, an application server or any other telephony device or endpoint may be configured to establish a connection with a backup signaling manager at any time during the communication session, or as the communication session is established. In this manner, switch over to a backup signaling manager may be accomplished more quickly and efficiently.

At step 206, a transfer condition for the communication session is detected. This is typically the point during the communication session in which the user of another endpoint participates in the communication session either in lieu of, or in addition to one of the endpoints. For example, if a user is waiting in the queue of an application server, the transfer condition may comprise the availability of an agent. When the agent is available, a second communication session is established with the transfer endpoint (e.g., agent) using the backup signaling manager to control signaling between the application server and the agent.

At step 210, a media stream of the first communication is linked with the media stream of the second communication session. For example, this step may include tunneling of media through an application server, as described with regard to FIGS. 2 and 3. This allows media to be exchanged between and endpoint and an agent through the application, by linking the communication session between the endpoint and the application server with the communication session between the application server and the agent.

The communication is monitored at step 212. At step 214, the status of the communication session is determined. For purposes of this example, the communication session being monitored is the communication session between the endpoint and the agent, which includes a linking of the first communication session with the second communication session, as described above. If the communication session is not complete, monitoring continues at step 212. If the communication session is complete, the communication session is ended at step 216. Ending the communication session includes tearing down the media communication stream between the endpoint and the application server, and tearing down the signaling communication link between the application server and the agent (through a call manager) and the media communication stream from the application server to the agent. At step 218, report data is updated. The report data may include some or all of the reporting data referred to with regard to FIGS. 2-4.

Figure 6:
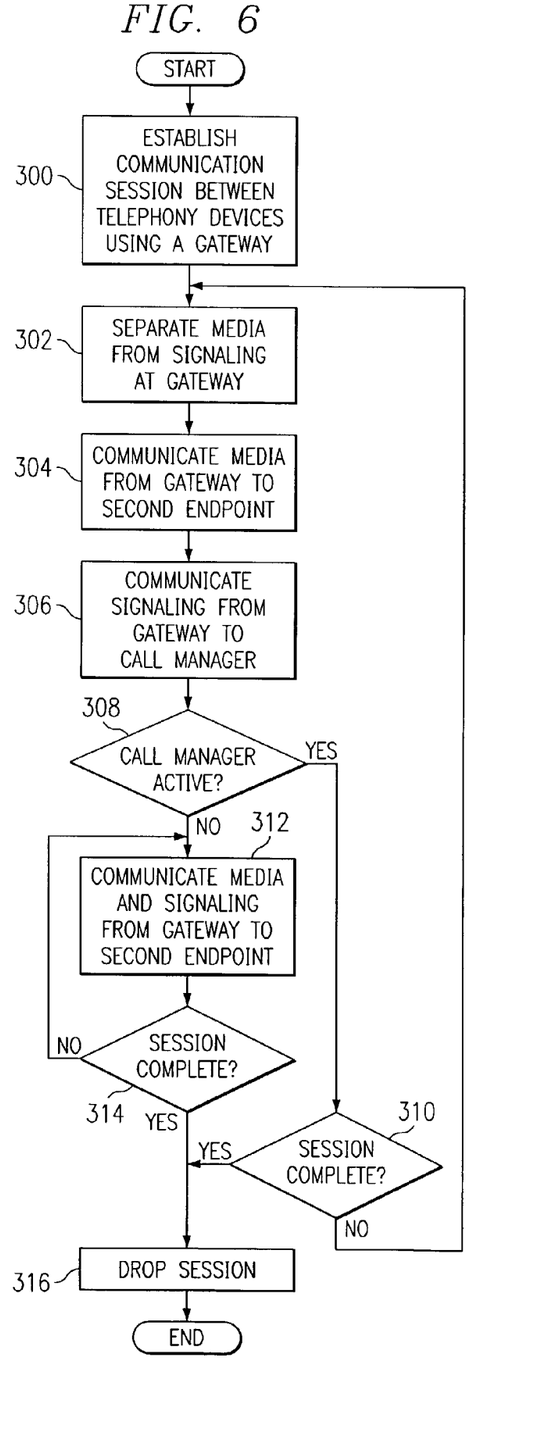
FIG. 6 illustrates a method for providing fault tolerant IP services, in accordance with another embodiment of the present invention.

FIG. 6 illustrates another method for providing fault tolerant IP services, in accordance with another embodiment of the present invention. The method begins at step 300 where a communication session is established between telephone devices using a gateway. For example, if one of the telephony devices is configured to communicate using the PSTN (e.g., not an IP telephony device), a gateway is used to communicate with IP telephony devices. At step 302, the gateway separates media from DTMF signaling. This is done because the analog telephony device communicates using the PSTN wherein media and signaling are done in-band. At step 304, media is communicated from the gateway to the second endpoint (e.g., IP telephony device). DTMF signaling, on the other hand, is communicated from the gateway to the call manager which acts as the intermediary signaling manager of the communication session between the gateway and the IP telephony device, at step 306.

At step 308, the status of the call manager is established. If the call manager is active, the status of the communication session is determined at step 310. If the communication is complete at 310, the session is dropped at step 316. If the session is not complete at step 310, the gateway continues to separate media from DTMF signaling at 302, and send the DTMF signaling out-of-band.

However, if the call manager fails, or is otherwise not active at step 308, the gateway communicates both media and signaling to the IP telephony device, at step 312. In this manner, the gateway essentially switches from out-of-band signaling to in-band signaling, after failure of the call manager is detected. This allows all of the data and information (both media and signaling) of the communication session to be communicated to the second endpoint. It should also be recognized that the second endpoint must be configured to operate in one of two modes, which includes an out-of-band signaling mode and an in-band signaling mode. Therefore, the second endpoint may be configured to detect failure of the call manager, and/or the gateway may be configured to notify the second endpoint of the failure of the call manager. At step 314 the status of the communication session is established. If the communication session is not complete, the gateway continues communicating both media and signaling to the second endpoint. If however, the communications session is complete at step 314, the communication session is dropped at 316.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for providing fault tolerant IP services, comprising:
   establishing a first communication session between an originating telephony device and an application server, using a primary call manager, wherein the application server is operable to route an incoming call from the originating telephony device to a destination telephony device;
   detecting a failure of the primary call manager before the incoming call is routed to the destination telephony device;
   maintaining a media communication link between the originating telephony device and the application server;
   establishing a second communication session between the application server and the destination telephony device using a backup call manager, the application server initiating the second communication session by communicating with the backup call manager; and
   coupling at least a portion of the first communication session and at least a portion of the second communication session at the application server to establish two-way communication between the originating telephony device and the destination telephony device.

2. The method of claim 1, further comprising transferring call control functionality from the primary call manager to the backup call manager.

3. The method of claim 1, wherein the application server comprises an automated attendant.

4. The method of claim 1, wherein the application server comprises an automatic call distributor.

5. The method of claim 1, wherein the application server comprises an interactive voice response system.

6. The method of claim 1, further comprising obtaining an address of the destination telephony device from the originating telephony device.

7. The method of claim 6, wherein the step of obtaining the address of the destination telephony device comprises obtaining the address using in-band adaptive speech recognition.

8. The method of claim 1, wherein the application server includes a database, and further comprising storing information regarding the first and second communication sessions at the database.

9. The method of claim 8, further comprising preparing a supervisor report which associates the first communication session with the second communication session.

10. The method of claim 1, further comprising monitoring heartbeat signals from the primary call manager at the application server, and wherein detecting the failure of the primary call manager comprises detecting loss of heartbeat signals.

11. The method of claim 1, wherein the application server is configured to prompt a user of the originating telephony device to respond to one or more queries by keying-in a response using touchtones, while the primary call manager is functioning properly, and further comprising:
   automatically prompting the user to respond to the one or more queries by speaking a response, after failure of the primary call manager is detected.

12. The method of claim 1, wherein the first communication session comprises a signaling communication link and a media communication link.

13. The method of claim 12, wherein the signaling communication link comprises a Java Telephony Application Programming Interface signaling communication link.

14. The method of claim 1, wherein the first communication session comprises a call control signal portion and a media communication portion, and wherein the at least a portion of the first communication session comprises the media communication portion.

15. A computer readable medium encoded with a computer program for providing fault tolerant IP services, the computer program when executed by a processor being operable to perform the following steps:
   establish a first communication session between an originating telephony device and an application server, using a primary call manager, wherein the application server is operable to route an incoming call from the originating telephony device to a destination telephony device;
   detect a failure of the primary call manager before the incoming call is routed to the destination telephony device;
   maintain a media communication link between the originating telephony device and the application server;
   establish a second communication session between the application server and the destination telephony device using a back-up call manager, the application server initiating the second communication session by communicating with the back-up call manager; and
   couple at least a portion of the first communication session and at least a portion of the second communication session at the application server to establish two-way communication between the originating telephony device and the destination telephony device.

16. The computer readable medium of claim 15, wherein the computer program is further operable to transfer call control functionality from the primary call manager to the back-up call manager.

17. The computer readable medium of claim 15, wherein the application server is configured to prompt a user of the originating telephony device to respond to one or more queries by keying-in a response using touchtones, while the primary call manager is functioning properly, and wherein the computer program is further operable to:
   automatically prompt the user to respond to the one or more queries by speaking a response, after failure of the primary call manager is detected.

18. The computer readable medium of claim 15, wherein the computer program is further operable to obtain an address of the destination telephony device from the originating telephone device using in-band adaptive speech recognition.

* * * * *

UNITED STATES PATENT AND TRADEMARK OFFICE
CERTIFICATE OF CORRECTION

PATENT NO. : 7,602,704 B2  
APPLICATION NO. : 10/225391  
DATED : October 13, 2009  
INVENTOR(S) : Shaffer et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1339 days.

Signed and Sealed this

Fifth Day of October, 2010

David J. Kappos  
*Director of the United States Patent and Trademark Office*